Patented June 25, 1940

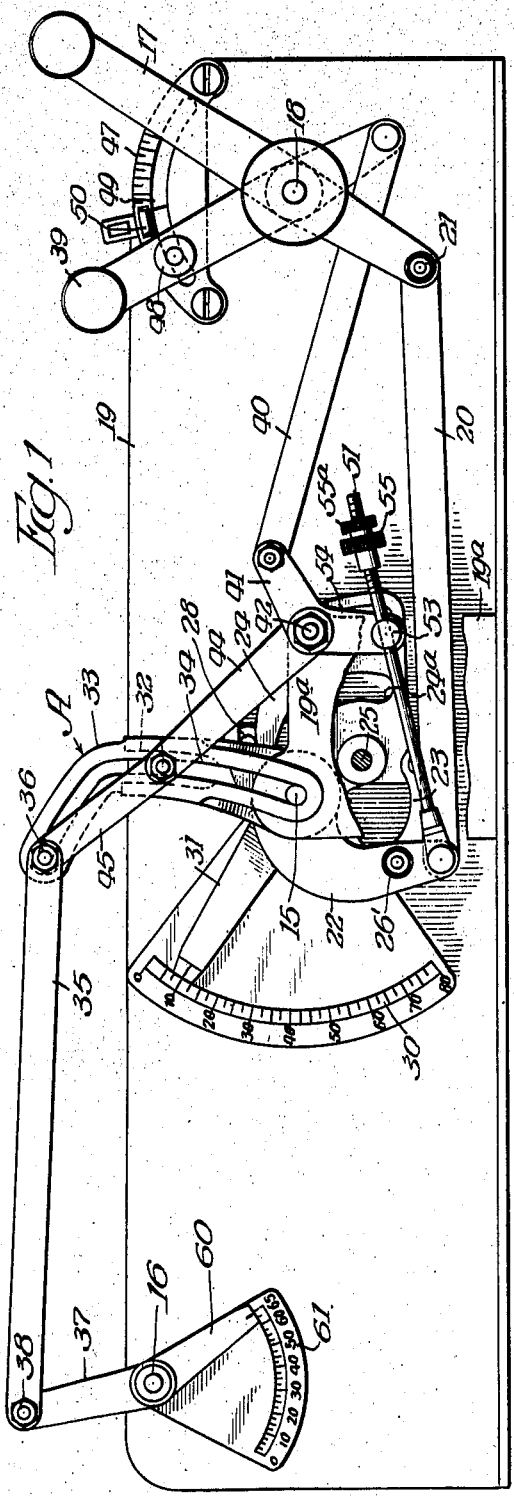

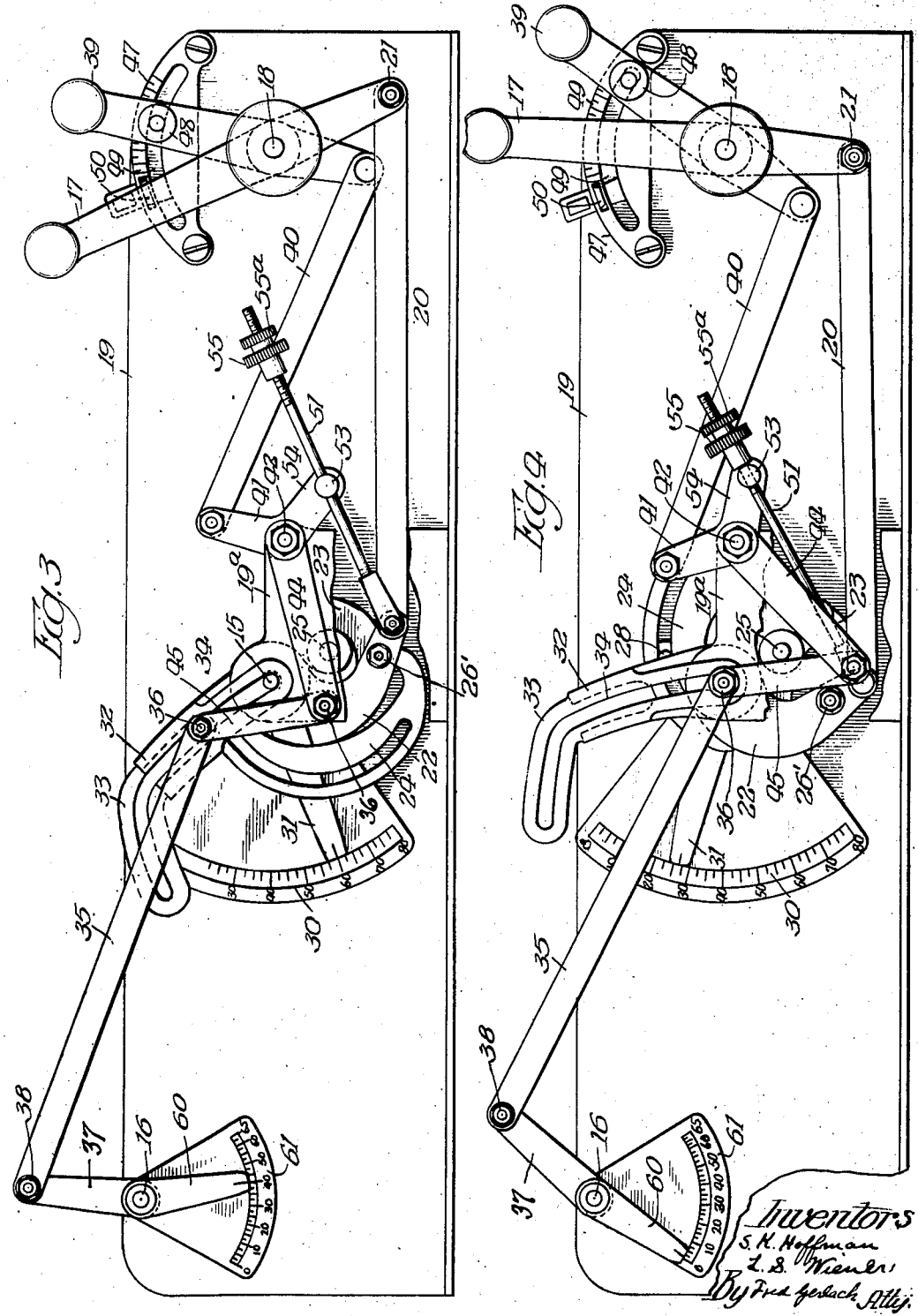

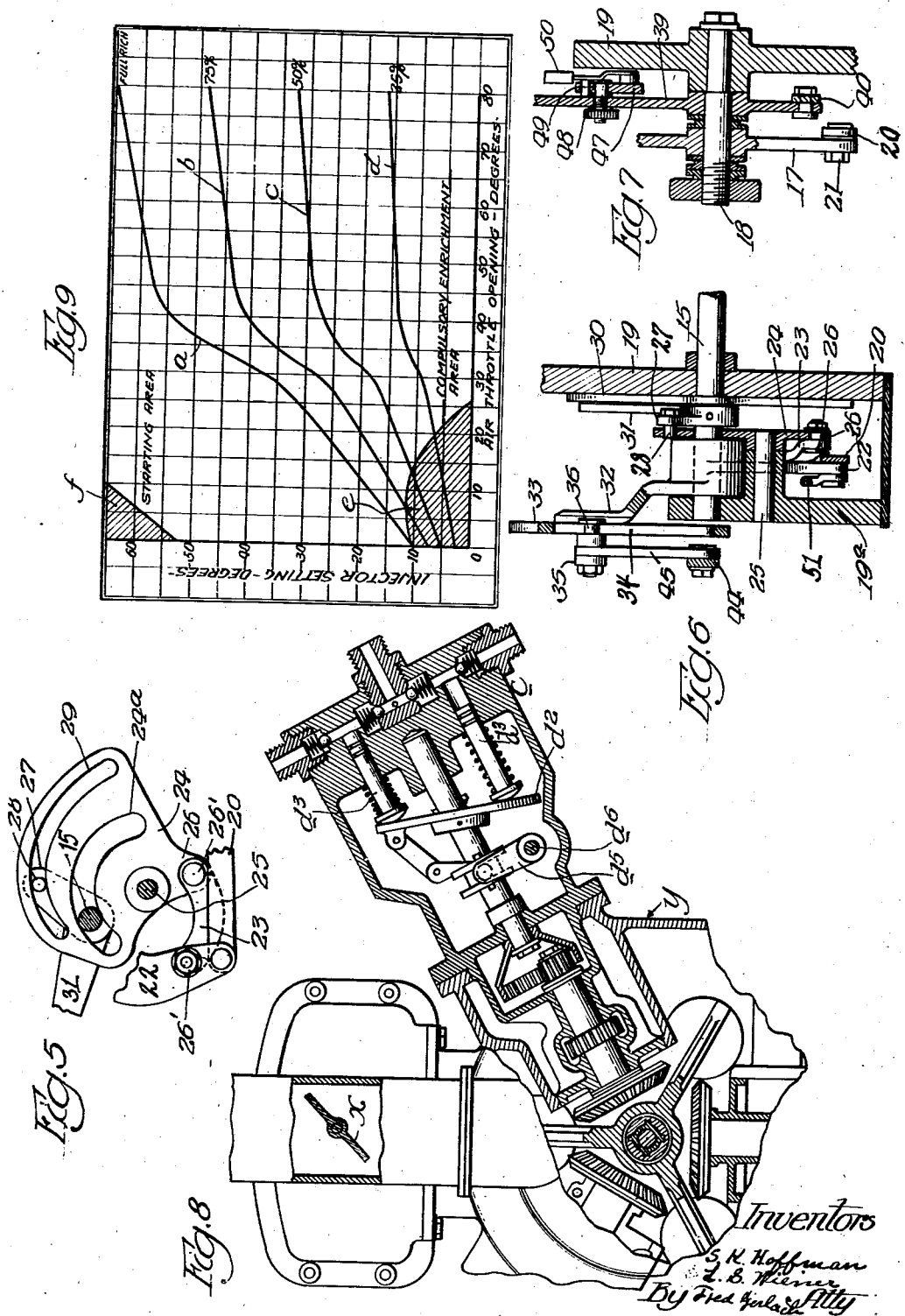

2,205,651

UNITED STATES PATENT OFFICE 2,205,651

CONTROL MECHANISM FOR INTERNAL COMBUSTION ENGINES

Samuel K. Hoffman and Leonard S. Wiener, Williamsport, Pa., assignors to Aviation Manufacturing Corporation, Williamsport, Pa., a corporation of Delaware Application February 8, 1937, Serial No. 124,712

5 Claims. (Cl. 123—139)

The invention relates to mechanism for controlling the supply of liquid fuel and air to internal combustion engines.

One object of the invention is to provide improved air and fuel injector controls which are co-related or inter-connected, and by which the full rich mixture strength provided will be of the desired fuel-air ratio at the optimum engine speed on a normal load curve based on the requirements of the engine, for example, when it is used to drive an airplane propeller, as determined by calibration of the particular design and the enrichment factors deemed advisable and by which the same fixed proportion of the full rich mixture strength will be provided for all settings of the air-throttle or the control lever for a leaner mixture or a reduced supply of air and fuel.

Another object of the invention is to provide improved air and fuel injector controls which are co-related or inter-connected so that the mixture strength may be varied by a mixture control lever adapted for different settings and by which, for any throttle setting, the fuel injector will be set to correspondingly reduce the supply of fuel in direct proportion to any given engine speed and the fuel delivered will be a proportionate percentage of the air delivered. For example, if the mixture lever is set for 75% full rich mixture, then for any throttle angle or setting, the fuel injector control will be set for a corresponding percentage of the full rich mixture strength. The percentage relationship over the entire range is desired for use as an altitude control. When once set at any altitude the correct relationship will be held on propeller load curve.

Another object of the invention is to provide improved air and fuel injector controls which are co-related or inter-connected and by which the fuel-percentage for starting may be increased so high that the use of a primer is not necessary.

A still further object of the invention is to provide improved air and fuel injector controls which are co-related or inter-connected and whereby the fuel supply may be cut off completely to stop the engine irrespective of air supply.

Another object of the invention is to provide improved air and fuel injector controls which are co-related or inter-connected and by which the injector control will be automatically shifted to supply the full rich mixture when the throttle is closed to a predetermined point.

Other objects of the invention will appear from the detail description.

The invention consists in the several novel features which are hereinafter set forth and are more particularly defined by claims at the conclusion hereof.

In the drawings: Fig. 1 is a front elevation of control mechanism embodying the invention, set in position for starting the engine. Fig. 2 is a similar view illustrating the control mechanism set for a full rich mixture of fuel and air. Fig. 3 is a similar view illustrating the control mechanism set for producing a mixture of intermediate richness. Fig. 4 is a similar view illustrating the control mechanism set for completely cutting off the supply of fuel. Fig. 5 is a view of parts of the mechanism for shifting the throttle operating shaft. Fig. 6 is a section on line 6—6 of Fig. 2. Fig. 7 is a section on line 7—7 of Fig. 2. Fig. 8 is a sectional view of a portion of an engine with a fuel injector and an air throttle for which the control mechanism is adapted. Fig. 9 is a diagram illustrating the fuel-air ratios produced with different throttle and fuel injector settings.

The invention is exemplified in connection with a shaft 15 which may be connected by any suitable means to the air-throttle $x$ of an engine $y$ to change the throttle setting proportionately to the movement of said shaft and a shaft 16 for imparting movement to the variable control means for the fuel-injector mechanism $c$ of the engine, to vary the volume of the charges of fuel injected or pumped to the cylinders of the engine. For example, shaft 16 may be connected to the shaft $d^6$ of an arm $d^5$ which is connected to angularly adjust an inclined pump-operating disk $d^2$ which is driven by the engine, as well understood in the art, and is adapted to vary the stroke of the fuel pumps $d^3$ which meter the fuel, and control the volume of fuel charges delivered to the engine. The construction of fuel-injector illustrated forms no part of the present invention and it is to be understood that the improved controlling mechanism is applicable to different types of fuel-injectors. The connections between the shaft 15 and the air throttle and the shaft 16 and the fuel-injection control are such as to produce variations in the settings of the air throttle and the fuel supply, which are proportionate to the movements of said shafts, respectively.

In the use of the invention with engines for propelling airplanes, the control levers for the engine are generally placed in the cock-pit of the plane and shafts 15 and 16 are connected, by suitable means, to operate, respectively, the air-throttle and the fuel-injector control of the engine.

The control-mechanism for co-relating the fuel injection and air throttle, comprises a hand-lever 17 which is centrally fulcrumed on a shaft 18 which is fixed in a suitable support 19; a link 20 having one of its ends pivoted at 21 to the lower end of lever 17; an arm 22 pivoted to swing on shaft 15 and to the lower end of which link 20 is pivoted; a cam 24 (Fig. 5) pivotally supported by a shaft 25; a curved link 23 pivoted at 26 to cam 24 and at 26' to arm 22; and an arm 27 fixed to the shaft 15 and provided with a stud 28 which extends into a cam-slot 29 in cam 24 and adapted to shift the pin 28 to rock arm 27 and the shaft 15 for imparting movement to the air-throttle a. Shaft 15 is journaled in the fixed support 19 and a bracket 19ª. Cam 24 has an arcuate slot 24ª to permit it to swing around shaft 15. Shaft 25 on which cam 24 fulcrums, is carried by bracket 19ª. Oscillation of lever 17 by the operator will impart proportionate movement to the air-throttle operating shaft 15 through link 20, arm 22, link 23, cam 24, cam slot 29, and stud 28 on the arm 27 which is fixed to the throttle shaft. An index arm 31 is fixed to the shaft 15 and its distal end travels across an arcuate scale 30 to enable the operator to read or determine the settings of the air-throttle and the corresponding volume of air-admitted to the engine.

The control-mechanism comprises a linkage which is operable by the lever 17 and co-related to the air throttle control for variation of the fuel charges according to the proportions required for different throttle settings. The linkage for setting the fuel-injector control-shaft 16 in co-relation with the throttle setting by lever 17 comprises an arm 32 on and rotating and swinging concentrically with the arm 22; an arm 33 fixed to arm 32 and provided with a slot 34; a link 35 provided at one of its ends with a stud 36 extending into and adapted to travel in slot 34; and an arm 37 fixed to shaft 16 and operable by the other end of the link 35 to which it is pivoted at 38.

Slot 34 in cam 33 permits the stud 36 to be shifted to and from the axis of arms 22, 32 and shaft 15 to vary the proportional angular movement between the arm 37 and shaft 16 and the arm 33 and shaft 15 responsive to settings of lever 17. The stud 36 is movable to and from the axis of arm 22 to increase or decrease the movement of arm 37 on the injector-control shaft 16 relatively to the movement of arms 33, 32, 22 and shaft 15 for the purpose of varying the fuel-air ration of the mixture supplied to the engine.

The mixture control comprises a lever 39 which is centrally fulcrumed on stud 18 concentrically with the lever 17; a connecting rod 40 pivoted to the lower end of lever 39; an arm 41 to which the other end of rod 40 is pivoted; a shaft 42 fixed to arm 41 and journaled in a bracket 19ª which is fixedly secured to support 19; an arm 44 fixed to the front end of shaft 42; and a link 45 pivoted at 46 to the distal end of arm 44 and to the stud 36 which is slidable in the slot 34 and carried by connecting rod 35. Oscillation of lever 39 will, through connecting rod 40, arm 41, shaft 42, arm 44 and link 45, move the stud 36 in the slot 34 to or from the axis of arms 33, 32 and shaft 15 to vary the stroke of link 35, arm 37 and the injector control shaft relatively to the lever 17 and the throttle operating shaft 15. This constitutes a proportionality linkage vari-able by the mixture-control lever 39 to vary the proportionate movements of the shafts 15 and 16 and to correspondingly vary the settings of the throttle and the fuel-injector control. The injector control and the throttle control remain co-related and are conjointly operable at all times by the lever 17 and by means of the mixture control lever 39 the proportion of the air admitted by the throttle and the fuel injected may be varied to vary the fuel-air ratio while both controls remain conjointly operative for different settings by the lever 17.

The lower end of slot 34 in arm 33 is extended downwardly to a point coincident with the axis of arms 33, 32 and shaft 15 to permit stud 36 to be shifted into coaxial position with arms 33, 32 to render the proportionality linkage whereby shaft 16 will be shifted, ineffective or into its zero position so that the injector control will be set to completely cut off the supply of fuel to the engine while the air-throttle remains shiftable by lever 17. This permits the lever 39 to be utilized to set the mixture control at zero for stopping the engine.

Arm 37 on shaft 16 carries an index arm 60 which swings across a fixed dial 61 to indicate in degrees, the settings of the fuel-injector control, to indicate the percentage of the full fuel charges which are being delivered to the engine.

Lever 39 swings across a plate 47 which is fixed to support 19 and is provided with a scale for indicating the settings of said lever. A set-screw 48 on a screw which is carried by lever 39 and extends through a slot 49 in plate 47, is adapted to lock the lever 39 in its assigned position.

A retractible spring stop 50 extends through plate 47 and is adapted to be normally engaged by lever 39 to limit its movement in one direction. This stop is positioned to co-relate the settings of the air-throttle and the fuel-injector so that, as long as the air density remains constant, the fuel-air ratio shall be of the full rich mixture strength for all throttle angles. The term "full rich mixture strength" applies to the fuel-air ratio at rated power and speed and varying with throttle position according to the corresponding propeller or other load curve and engine requirements and the maximum enrichment for the optimum operation of the engine. The mixture strength may be varied by the shift of lever 39 throughout the full desired range from zero to full rich by adjusting lever 39 at positions of the throttle except in the compulsory enrichment range.

Stop 50 is on a resilient finger-lever, whereby the stop may be retracted from the path of lever 39 so it can be shifted beyond its full rich mixture position (Fig. 1) to set the fuel-injector control shaft 16 for the maximum fuel pump capacity while the throttle is open to, say, up to 10° so that the mixture will have a higher fuel ratio than full rich and will be sufficiently rich for starting the engine without priming.

There is also provided means for returning the mixture-control lever 39 to its full rich setting when the throttle is nearly closed at lean mixture settings. This means comprises a rod 51 pivoted to the arm 22 which is shiftable by lever 17 through link 20; a stud 53 through which rod 51 is slidable; an arm 54 in which stud 53 is journalled and which is rigid with shaft 42 and arms 41 and 44; and an adjustable stop-nut 55 threaded to the free end of rod 51. A lock-nut 55ª secures the nut 55 in its assigned position. When the mixture control lever 39 is set for a lean mixture and lever 17 is set to close the throttle beyond a predetermined degree, say 26°, arm 22 will hold rod 51 so that stop-nut 55 will abut against stud 53 during the further movement of lever 17 to reduce the throttle angle below 26°, which will cause nut 55 to shift stud 53 and rock arms 54, 44 and 41. Arm 41 will thereupon shift rod 40 to bring lever 39 against the full rich stop 50. Simultaneously the injector-control shaft 16 will be shifted to its full rich mixture setting through the movement of shaft 42, arm 44, link 45, stud 36, link 35 and arm 37. As a result, whenever the throttle is set for less than a predetermined angle, while the mixture control lever is set for too lean a mixture for operating the engine, at lower throttle settings, the fuel-injector control will be set, concurrently with the setting of lever 17, for a full rich mixture, as shown in Fig. 2. By adjusting the nut 55 on rod 51, the zone of compulsory enrichment may be varied for the minimum throttle opening desired.

The chart (Fig. 7) indicates the settings of the full injector-control and the air-throttle openings in degrees in different positions of the levers 17 and 39. The line a indicates the percentage of the fuel-injection and the degree of throttle-opening angle during the full range of the settings of the lever 17 while the mixture control lever 39 is in its full rich mixture position (Fig. 2) or against the stop 50. The line b indicates the percentage of fuel-injection during the full range of settings of lever 17 when the mixture control lever 39 is set for a 75% full rich mixture. The line c indicates the percentage of fuel supply during the full range of the settings of lever 17 while the mixture control lever 39 is set for a 50% full rich mixture. The line d indicates the percentage of fuel injection to the engine during the full range of settings of lever 17 while the mixture control lever 39 is set for 25% of the full rich mixture. The zone e indicates the compulsory enrichment area, which results from shifting of the mixture control lever 39 to its full rich mixture position while the throttle opening is reduced to less than 26°. The zone f indicates the percentage of fuel delivered to the engine while the mixture lever 39 is set beyond the stop 50 and above its full mixture position for starting the engine.

For operation at sea level with full rich mixture the lever 39 is set against the stop 50 which will control the injector for the full rich mixture or fuel percentage (Fig. 2). The throttle lever 17 may then be set for all points between the 0° and its maximum opening while the fuel-injector capacity will vary with the air flow through the throttle, as indicated by the curve a, to maintain the maximum desired fuel-air ratio for engine speed on a normal propeller or load curve.

For operating with a reduced mixture strength, the mixture control lever 39 may be set anywhere between its zero position and the stop 50. For example, if it is set at the point for a 75% full rich mixture, the fuel-air ration will be as indicated by line b, or if set at 50 or 25%, the fuel-air ratios will be as shown by lines c and d. The fuel-injector will be set for corresponding percentages of the full rich mixture. The fuel-supply is directly proportional to the position of the mixture control lever 39 for any given engine speed and, as a result, the fuel delivered at any throttle setting will be a corresponding percentage of the amount delivered at the same air flow with full rich mixture setting.

When lever 39 is shifted for varying the fuel-air ratio, the stud 36 will be shifted to and from the axis of arm 32 and resultantly the proportional movement of the injector-control shaft 16 will be increased or decreased relatively to the shift of the throttle control shaft 15 and the throttle. Consequently, the fuel delivered to the engine at any throttle setting will be of a percentage of the air flow at the different throttle settings.

For starting the engine when it is cold the lever 39 is advanced beyond the retractible stop 50 to shift the stud 36 to the outer end of slot 34 in arm 33 (Fig. 7) and the lever 17 will be shifted to a point having its starting range, say 10°, open. Lever 17 will then control the throttle up to a 10° angle, as indicated by the zone f, so that the mixture will be of sufficient richness to effect a speedy starting of the engine. With this setting it is possible to obtain the maximum capacity of the fuel-injector with the throttle nearly closed. The maximum available injector setting is available at any throttle angle.

The engine can be stopped by advancing the throttle lever to a point more than 26° open and setting the mixture control lever 39 at zero percentage of the rich mixture strength (Fig. 4). In this position of lever 39, stud 36 is coaxial with or on the dead center of arm 33, so that it will be inoperative to shift link 35 and the injector control shaft 16 until lever 17 is shifted. When stud 36 is on the dead-center of arm 32, shaft 16 will be positioned to cut off the delivery of fuel by the injector mechanism.

At any setting of mixture control lever 39 for less than its full rich mixture, the lever 17, when it is shifted to close the throttle to below 26° will automatically shift the proportionality linkage (arm 33, stud 36, link 35 and shaft 16) for the full rich mixture.

The invention is not to be understood as restricted to the details set forth, since these may be modified within the scope of the appended claims, without departing from the spirit and scope of the invention.

Having thus described the invention, what we claim as new and desire to secure by Letters Patent is:

1. In controlling mechanism for internal combustion engines, the combination with a variable force-feed fuel injector and an air throttle of controlling means for the injector and the throttle comprising a control-lever, connections operable by the lever for simultaneously shifting the throttle and varying the fuel injector to vary the supply of both air and fuel at a constantly maintained ratio through substantially the entire range of variation, said connections comprising an adjustably connected arm and link, and means for adjusting the connection between the arm and link to vary the fuel-air ratio and into position to bring one end of the link to the axis of the arm to render the arm ineffective to shift the link.

2. In controlling mechanism for internal combustion engines, the combination with a variable force-feed fuel injector and an air throttle of controlling means for the injector and the throttle comprising a control-lever, connections operable by the lever for simultaneously shifting the throttle and varying the fuel injector to vary the supply of both air and fuel at a constantly maintained ratio through substantially the entire range of variation, a lever for relatively adjusting the connections to vary the fuel-air ratio, and means for automatically adjusting the connection to increase the fuel percentages when the control-lever is shifted to reduce the air below a predetermined point.

3. In controlling mechanism for internal combustion engines, the combination with a variable force-feed fuel injector and an air throttle of controlling means for the injector and the throttle comprising a control-lever, connections operable by the lever for simultaneously shifting the throttle and varying the fuel injector to vary the supply of both air and fuel at a constantly maintained ratio through substantially the entire range of variation, a lever for relatively adjusting the connections to vary the fuel-air ratio, and a retractible stop positioned to stop the adjusting lever at a full rich mixture setting and releasable to permit the control-lever to be shifted for a higher fuel-percentage for starting.

4. In controlling machanism for internal combustion engines, the combination with a variable force-feed fuel injector and an air-throttle, of controlling means for the injector and the throttle comprising a control-lever, connections operable by the lever for simultaneously shifting the throttle and varying the fuel injector to vary the supply of both air and fuel at a constantly maintained ratio throughout substantially the entire range of variation, said connections comprising an arm to which the control lever is connected, a cam rotatable by said arm, a link having pivotal and sliding connection with said cam and connected to shift the throttle, an adjusting lever pivoted concentrically with the control-lever, and a connection between the adjusting lever and the throttle shifting link for adjusting the connection between the link and the cam.

5. In controlling mechanism for internal combustion engines, the combination with a variable force-feed fuel injector and an air-throttle, of controlling means for the injector and the throttle comprising a control-lever, connections operable by the lever for simultaneously shifting the throttle and varying the fuel injector to vary the supply of both air and fuel at a constantly maintained ratio throughout substantially the entire range of variation, said connections comprising an arm to which the control lever is connected, a cam concentric with and operable by said arm, a link having pivotal and sliding connection with said cam and connected to shift the throttle, an adjusting lever, and a connection between the adjusting lever and the throttle shifting link for adjusting the connection between the link and the cam.

SAMUEL K. HOFFMAN.
LEONARD S. WIENER.